C. E. LINEBARGER.
METHOD AND APPARATUS FOR MAKING SMALL BALLS OR PELLETS.
APPLICATION FILED APR. 8, 1920.

1,393,383.

Patented Oct. 11, 1921.

Witness
A. Glowacki

Inventor
Charles E. Linebarger
By Andrews & Kindell
Attys

UNITED STATES PATENT OFFICE.

CHARLES E. LINEBARGER, OF CHICAGO, ILLINOIS.

METHOD AND APPARATUS FOR MAKING SMALL BALLS OR PELLETS.

1,393,383. Specification of Letters Patent. Patented Oct. 11, 1921.

Application filed April 8, 1920. Serial No. 372,340.

*To all whom it may concern:*

Be it known that I, CHARLES E. LINEBARGER, a citizen of the United States, residing at Chicago, in the county of Cook and State of Illinois, have invented certain new and useful Improvements in Methods and Apparatus for Making Small Balls or Pellets, of which the following is a specification.

This invention relates to methods and apparatus for making small balls or pellets, and has for its object an improved method for manufacturing pellets so that they may be made rapidly, and at the same time made of uniform size and shape. It is well understood that when a substance is melted and allowed to drop freely from an orifice all of the drops will tend to become spherical and uniform in size; if the drops fall sufficiently slowly to harden before being stopped, especially if the force of gravity is overcome more or less as the mass is falling, the sphericity of the ball will be very perfect; and if the masses are allowed by their own weights to pull apart from the melted mass as a whole, as may be the case when the substance flows downwardly through some orifice, the balls formed will be very uniform in size. In general the method which I have invented consists in forming small balls or pellets in this manner; and the invention consists further in providing suitable apparatus for carrying out the method. The various objects of the apparatus will be apparent from a consideration of the accompanying drawings and the following description thereof.

Figure 1:
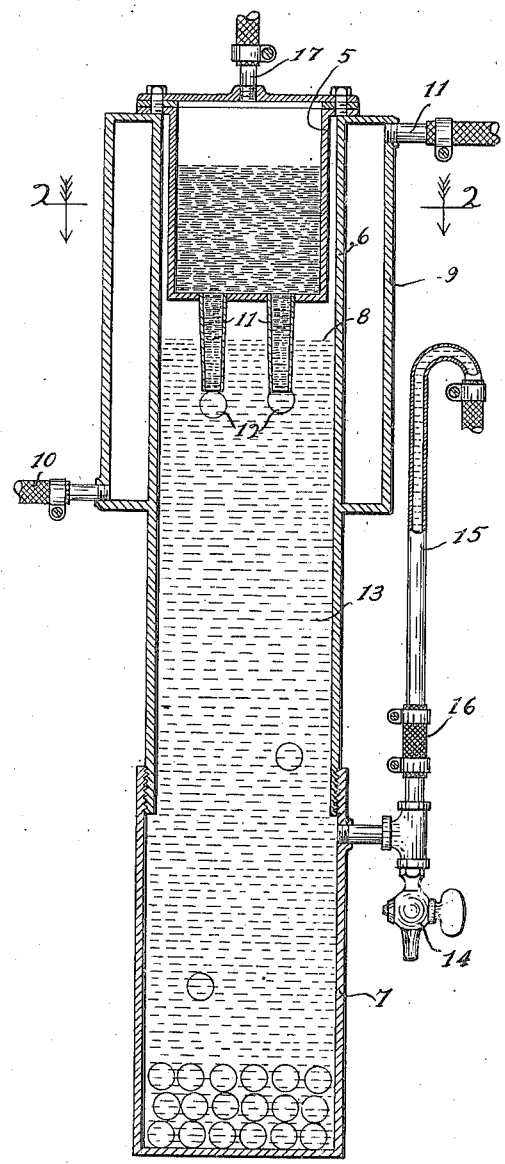
Figure 2:
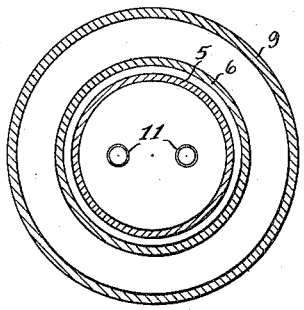

Of the accompanying drawings Figure 1 is a central sectional view of the apparatus which I have provided for carrying out my invention; and Fig. 2 is a section along the line 2—2 of Fig. 1.

Although my method and the apparatus which I have provided may be used for various other purposes, yet for the purpose of illustration, I will describe the apparatus as applied to the manufacture of pellets or small balls composed of organic substances which melt at comparatively low temperatures. The substance of which the balls are to be made is placed in a melting vessel 5 which is arranged to be conveniently placed in the open end of an elongated dropping tube 6. The tube is screwed into a receiving vessel 7, or is connected to the vessel 7 by any suitable liquid tight means. When in use the vessel 7 and the tube 6 are filled with some suitable liquid up to a suitable elevation 8. The liquid to be used depends upon the composition of the balls. In this particular instance for convenience I will speak of the liquid as water as that may be used with substances the melting point of which is between the ordinary temperatures of the air and the temperature of boiling water. A heating jacket 9 surrounds the upper end of the tube 6, and into this jacket chamber may be passed any suitable heating fluid, such as steam, by means of one of the pipes 10 or 11, and may be allowed to pass off through the other pipe; so that the temperature of the upper end of the water in the tube 8 may be maintained at substantially the boiling point, or at any other temperature desired, depending upon the heating fluid used, its temperature, and the rate of flow through the water jacket chamber. The contents of the vessel 5 are also heated by means of the steam in the water jacket chamber, so that the substance is kept in a fluid condition if its melting point is below the temperature of the fluid in the jacket 9.

In operation the substance is placed in the jacket 5 either melted or not as may be desired, and when heated sufficiently by the fluid in the jacketing means, the substance will flow downwardly through the tubes 11. As many tubes may be used as is desired. For the purpose of illustration I have shown only two. As the melted substance flows downwardly drops 12 will be formed at the outlets of the tubes, and when the force of gravity acting on the drops is sufficient to overcome the buoyancy of the liquid 13 and the cohesion of the substance itself, the masses will break loose and move downwardly in the liquid, it being understood that the specific gravity of the substance is greater than that of the fluid. The buoyancy of the liquid will retard the downward movement of the balls, and hence will give the substance time, although it may have considerable viscosity, to take the spherical shape while passing through the hot liquid in the uper portion of the tube 6 which is understood to be of a higher temperature than the melting point of the substance of which the balls are made. Also the buoyancy of the liquid by overcoming materially the force of gravity will give still more opportunity for the cohesion of the masses to form them into spherical shapes. However, as the masses pass into the cooler water in the lower portion of the tube they will be rapidly cooled below the melting temperature of the substance; and when the bottom of the vessel is reached the balls will be sufficiently hardened to prevent any deformation when they strike. Hence, by this method, I am able to provide very rapidly balls of considerable size, of substances which are more or less of a plastic and viscous nature, so that they are very uniform in size and shape; and by properly mixing the substances of which they are composed the balls will also be homogeneous throughout, and all will be of the same composition.

When the vessel 7 becomes full of balls they may be removed by any suitable means. I prefer to drain the liquid out of the tube 13 by means of the pet cock 14, then unscrew and remove the vessel 7, and pour out the balls. The vessel may then again be filled with liquid in any suitable manner, and the process repeated. In order to maintain the elevation of the liquid level at the desired point I provide an overflow tube 15 having a flexible joint 16 so that the upper end of the tube may be varied in elevation. This may be done whenever it is desired to vary the elevation of the water level 8, either in order to use vessels 5 of varying lengths or to vary the elevation of the liquid with reference to the outflow tubes 11.

The rate at which the balls are formed, and also the size of the balls themselves depends somewhat upon the relative pressures on the substance in the vessel 5 and on the liquid at the outlets 12. In order to vary the pressure in the vessel 5 I provide a pipe 17, which may be connected in any suitable manner to any suitable means for increasing the presure in the vessel 5 above the atmospheric pressure or reducing it below such pressure. In this way any desired pressure on the substance in the vessel may be provided for. The pressure of the water on the outlets of the tubes 11 may also be varied slightly by the elevation of the water in the tube 6, it being understood that the water level 8 may be anywhere between the outlets of the tubes 11 and the upper end of the tube 6. Also the size of the balls will depend upon the relative densities of the balls and the liquid 13.

Obviously various modifications may be made by those skilled in the art in the apparatus which I have described for carrying out my method, without departing from the spirit of my invention as disclosed by the following claims; such as various other means for heating the upper end of the dropping chamber 6, or for passing the melted substance from the melting pot into the liquid below; and means may be provided for continuously removing the balls while the apparatus is in operation.

I claim as my invention:

1. A method of making pellets consisting in causing drops of the substance of which the pellets are to be made to be formed in a relatively warm layer of liquid, and to move freely through said liquid into a cooler layer of liquid.

2. A method of making pellets consisting in causing drops of the substance of which the pellets are to be made to be formed in a relatively warm layer of liquid, and to move freely through said liquid into a cooler layer of liquid, the temperature of the warm liquid being higher than the melting point of the substance.

3. A method of making pellets consisting in causing drops of the substance of which the pellets are to be made to be formed in a relatively warm layer of liquid, and to move freely through said liquid into a cooler layer of liquid, the temperature of the cooler liquid being below that of the melting point of the substance.

4. A method of making small balls of a substance consisting in allowing the melted substance to pass out of a vessel a drop at a time into a layer of liquid at a temperature near the melting point of the substance, and in allowing the drops to pass freely from said liquid into a layer of liquid having a temperature below that of the melting point of the substance.

5. A method of making small balls of a substance consisting in allowing the melted substance to pass out of a vessel a drop at a time into a layer of liquid at a temperature near the melting point of the substance, in allowing the drops to pass freely from said liquid into a layer of liquid having a temperature below that of the melting point of the substance, and in maintaining a pressure on the substance when in the vessel unlike the pressure on the drops when in the warmer layers of liquid.

6. A method of dividing a solid material into parts of substantially uniform size and shape consisting in melting the material, in causing drops of it to be formed within a hot layer of liquid floating upon a colder layer, and in causing the material to harden by flowing through the colder layer.

7. Apparatus for forming pellets comprising a vessel adapted to contain a liquid, means for heating the upper end of the vessel, a second vessel adapted to hold the pellet material, said second vessel being mounted in the upper end of the first mentioned vessel, and an outlet in the lower side of said second vessel arranged to project into the liquid contained in said first mentioned vessel.

8. Apparatus for forming pellets comprising a vessel adapted to contain a liquid, means for heating the upper end of the vessel, a second vessel adapted to hold the pellet material, said second vessel being mounted in the upper end of the first mentioned vessel, an outlet in the lower side of said second vessel, and means for varying the pressure on the surface of the material when contained in said second vessel.

9. A method of making pellets consisting in forming drops of the melted substance of which the pellets are to be made, in a warm layer of a liquid which is a little less dense than the substance, and in allowing the substance to move freely through said liquid into a cooler layer of liquid.

In testimony whereof, I hereunto set my hand.

CHARLES E. LINEBARGER.